United States Patent
Wu

(10) Patent No.: US 11,740,403 B2
(45) Date of Patent: Aug. 29, 2023

(54) OPTICAL FIBERS WITH HIGH-TEMPERATURE WRITE-THROUGH COATINGS

(71) Applicant: OFS FITEL, LLC, Norcross, GA (US)

(72) Inventor: Hongchao Wu, East Brunswick, NJ (US)

( * ) Notice: Subject to any disclaimer, the term of this patent is extended or adjusted under 35 U.S.C. 154(b) by 0 days.

(21) Appl. No.: 17/289,164

(22) PCT Filed: Dec. 3, 2019

(86) PCT No.: PCT/US2019/064139
§ 371 (c)(1),
(2) Date: Apr. 27, 2021

(87) PCT Pub. No.: WO2020/117741
PCT Pub. Date: Jun. 11, 2020

(65) Prior Publication Data
US 2021/0396928 A1    Dec. 23, 2021

Related U.S. Application Data

(60) Provisional application No. 62/776,222, filed on Dec. 6, 2018.

(51) Int. Cl.
*G02B 6/02* (2006.01)
*C03C 25/105* (2018.01)
*G01K 11/3206* (2021.01)
*C08G 77/20* (2006.01)

(52) U.S. Cl.
CPC ........ *G02B 6/02395* (2013.01); *C03C 25/105* (2013.01); *G01K 11/3206* (2013.01); *G02B 6/021* (2013.01); *C08G 77/20* (2013.01)

(58) Field of Classification Search
CPC .. G02B 6/02395; G02B 6/021; C03C 25/105; G01K 11/3206; C08G 77/20
See application file for complete search history.

(56) References Cited

U.S. PATENT DOCUMENTS

| | | |
|---|---|---|
| 6,652,975 B2 | 11/2003 | Kuck et al. |
| 9,746,605 B2 | 8/2017 | Sohma et al. |
| 10,627,335 B2 | 4/2020 | Tanaka et al. |
| 11,248,144 B2 | 2/2022 | Simoff et al. |
| 2017/0010411 A1* | 1/2017 | Li ........................ C03C 25/1065 |
| 2017/0204290 A1* | 7/2017 | Simoff ................ C09D 183/06 |

FOREIGN PATENT DOCUMENTS

WO    WO 03085058    10/2003

* cited by examiner

*Primary Examiner* — John Bedtelyon
(74) *Attorney, Agent, or Firm* — Wendy W. Koba, Esq.

(57) ABSTRACT

An optically transparent protective coating is described that remains stable at elevated temperatures associated with optical fiber-based sensor applications and is sufficiently transparent to allow for conventional fiber Bragg gratings (FBGs) to be formed by directly writing through the coating. In particular, vinyl group-containing silicone polymers have been found to provide the UV transparency required for a write-through coating (WTC) and promising mechanical properties for protecting the optical fibers, while also being able to withstand elevated temperatures for extended periods of time.

16 Claims, 5 Drawing Sheets

OPTICAL FIBERS WITH HIGH-TEMPERATURE WRITE-THROUGH COATINGS

CROSS-REFERENCE TO RELATED APPLICATIONS

This application claims the benefit of U.S. Provisional Application No. 62/776,222, filed Dec. 6, 2018 and herein incorporated by reference.

TECHNICAL FIELD

The present invention relates to optical fibers formed to include grating structures such as fiber Bragg gratings (FBGs) and, more particularly, to the utilization of a protective coating through which the gratings may be directly formed in the fiber and thereafter remain stable at the elevated temperatures experienced in a variety of fiber-based sensor applications.

BACKGROUND OF THE INVENTION

FBGs find a growing demand in many industrial sensing applications as a result of their high optical signal sensitivity to changes in environmental factors, such as temperature, strain, and the like. The traditional method of forming an FBG in an optical fiber core (and/or the cladding surrounding the core) requires the stripping away of multiple layers of cladding and coating material from a finished section of optical fiber to expose the central core/cladding, "writing" the grating in the core with a light source that periodically changes the refractive index along the core (also referred to at times as grating inscription), and then re-coating the section of fiber that has been stripped. This "strip-write-recoat" process not only limits the efficiency of producing FBGs in a high volume manner, but also introduces the possibility of breakage (or at least weakening) of the recoated portions of fiber within which the FBGs are formed.

The need for a "write-through coating" (WTC) has thus become a pressing demand on the industry, particularly with the proliferation of sensor applications that utilize long lengths (meters) of FBG-containing optical fibers (referred to at times as "continuous FBGs"). An acceptable WTC obviously needs to be transparent to the wavelength(s) used to write the FBGs, which is typically in the UV range (wavelengths of 240 nm and 248 nm are commonly used for this purpose). Aliphatic urethane acrylates have been proposed for use as a WTC since these materials have the necessary UV transparency and are also curable using a UV source. However, such coatings have been found to decompose when exposed to temperatures in excess of 100° C. for extended periods of time and, therefore, lack the thermal stability required for high temperature applications, such as downhole or in-well applications that operate at temperatures of at least about 150° C. While RTV silicone-based coatings have demonstrated better thermal stability than the urethane acrylate materials, the coated surface is relatively soft and tacky, causing significant handling issues during FBG production. RTV silicone-based coatings also have a relatively high level of UV absorbency, resulting in a relatively inefficient grating inscription process.

SUMMARY OF THE INVENTION

The needs remaining in the prior art are addressed by the present invention, which relates to optical fibers including fiber Bragg gratings (FBGs) that are created by writing through an optically transparent protective coating on the fiber and, more particularly, to an optically transparent protective coating that remains stable at the elevated temperatures experienced in a variety of FBG applications.

In accordance with the principles of the present invention, it has been found that vinyl group-containing silicone polymers (hereinafter referred to as "VG-containing silicone polymers") provide the UV transparency required for use as a write-through coating (WTC), while also being able to withstand elevated temperatures for extended periods of time. Unlike conventional polymer coatings, the VG-containing silicone polymer coating utilized in accordance with the present invention does not exhibit an adhesive/tacky quality and is therefore easier to handle and manipulate during use than various prior art approaches.

In one exemplary embodiment, a single layer of a VG-containing silicone polymer (of appropriate thickness) is utilized as a high-temperature WTC for an optical fiber (particularly one used as a sensor with long sections of FBGs) in accordance with the principles of the present invention. In an alternative embodiment, a dual-layer configuration of VG-containing silicone polymers is used, with an inner layer being relatively pliable (to minimize microbend-induced transmission loss) and a relatively stiff outer layer that is still UV transparent but exhibits a higher degree of mechanical stability than the inner layer.

In yet another embodiment, an additional thermoplastic cabling polymer (such as polyether-ether-ketone (PEEK), among others) may be included as an over-jacketed layer to surround the VG-containing silicone polymer WTC (either a single layer or dual layer configuration) to impart additional mechanical protection and thermal stability at temperatures above, for example, 250° C.

An exemplary embodiment of the present invention takes the form of an optical fiber comprising an optical core region, a cladding layer surrounding the optical core region, and a write-through coating (used to provide in-place inscription of gratings) formed over the cladding layer. The write-through coating comprises a vinyl group-containing silicone polymer coating that has a UV absorption of about 0.5 Au ("absorption units") at wavelengths used for grating inscription and a thermal stability at temperatures up to about 150° C.

Another embodiment of the present invention may take the form of a method of fabricating an optical fiber comprising the steps of: (1) providing an initial fiber having a core region and a cladding layer surrounding the core region, (2) applying an acrylate group-containing silicone polymer liquid material over the cladding layer, and (3) curing the acrylate group-containing silicone polymer liquid material into a write-through coating having a UV absorbance of less than 10% at wavelengths used for grating inscription and a thermal stability at temperatures up to about 150° C.

Other and further embodiments and aspects of the present invention will become apparent during the course of the following discussion and by reference to the accompanying drawings.

BRIEF DESCRIPTION OF THE DRAWINGS

Referring now to the drawings, where like numerals represent like parts in several views.

DETAILED DESCRIPTION

Disclosed herein are optical fibers having a vinyl group-containing silicone polymer (hereinafter referred to as "VG-containing silicone polymer") coating. The VG-containing silicone polymer coating is disposed onto optical fibers, preferably glass fibers, or onto other optical substrates that can have light-induced (for example, UV-induced, or infra-red-induced) optical devices written into one or more portions within the optical fiber or substrate without removing the VG-containing silicone polymer coating, thus permitting high speed manufacture of thermally and optically robust fiber gratings. The optical devices can be a grating, preferably a fiber Bragg grating. The optical fiber can comprise a glass optical core and a glass cladding, for example.

The VG-containing silicone polymer WTC of the present invention can be applied to a variety of optical fibers, including those comprising a glass optical core and a glass cladding. Suitable optical fibers can include an inner core of relatively high refractive index, and an outer cladding with a lower refractive index than the inner core. The glass optical core can be made of UV photosensitive glass, such as germanosilicate, allowing for a grating to be written into the glass by UV radiation. The optical fiber is typically from 100 to 150 µm in diameter, although other diameters are useful, as will be appreciated by one of ordinary skill in the art.

The VG-containing silicone polymer coating can be applied to the glass fiber in any suitable manner, such as those known to a person of ordinary skill in the art, including using a draw tower to apply a coating to the glass fiber. The applied VG-containing silicone polymer coating can thereafter be cured in any suitable manner, including UV curing or thermal curing. In an example, coatings can be partially cured using UV lamp exposure followed by thermal curing. As will be discussed in detail below, the UV dosage used for curing has been found to influence the UV transmittance of the coating, where a higher dose yields a coating with a higher transparency.

After the VG-containing silicone polymer coating has been applied to the optical fiber and cured, the grating structure is then inscribed along the length of the fiber without requiring removal of the coating. As will be discussed further below, the cured, VG-containing silicone polymer coating has significant optical transparency at the wavelength of 248 nm, the wavelength often used for FBG fabrication. Writing with lasers at other wavelengths is possible, particularly in the UV range, or infrared range.

Figure 1:
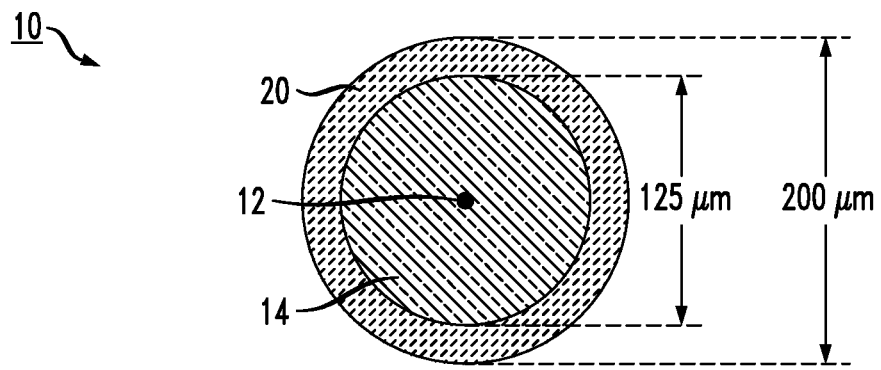
FIG. 1 is a cross-sectional view of an exemplary optical fiber including the inventive WTC formed in accordance with the present invention.

A cross-section of a fiber formed to include a VG-containing silicone polymer WTC of the present invention is shown in FIG. 1. An optical fiber 10 includes a core region 12 and a surrounding cladding layer 14 (where layer 14 may comprise one or more individual layers of differing refractive index values). A VG-containing silicone polymer WTC 20 is shown as formed to surround cladding layer 14. In order to achieve the desired combination of high thermal stability and low UV absorbance, Si—O and Si—C bonding are preferable. Thus, a vinyl group-containing silicone via radical polymerization (here, defined as "VG-containing silicone polymer") is used. In one example, VG-containing silicone polymer WTC 20 is formed to a thickness of 37.5 µm when used with a conventional 125 µm single-mode optical fiber. By tuning the optimized draw speed and the temperature at which VG-containing silicone polymer WTC 20 is applied, the resultant coated fiber 10 may be formed without introducing any observable flaws in the coating itself.

Figure 2:
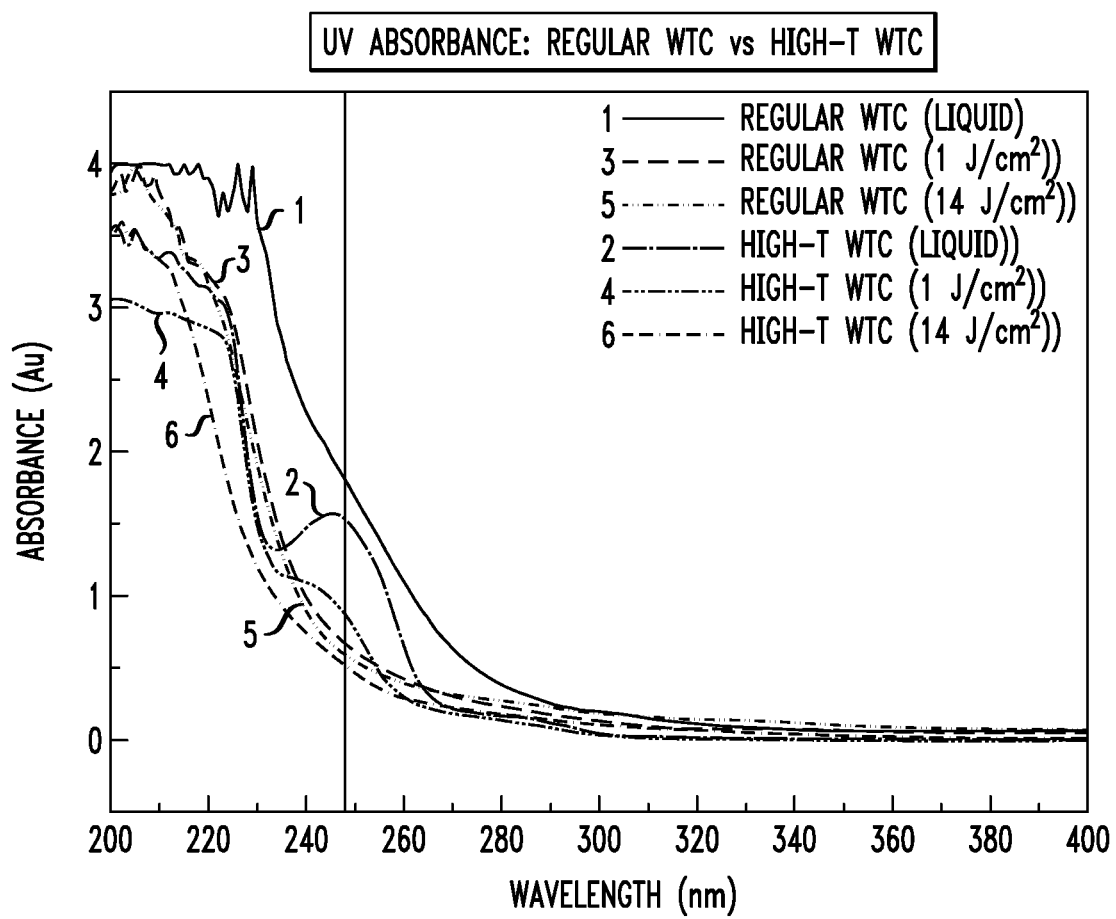
FIG. 2 includes graphs of UV absorbance as a function of wavelength for a set of prior art coating films and a set of WTC films of the present invention.

As mentioned above, WTC 20 is required to exhibit good UV transparency (i.e., a low UV absorbance) so as to enable FBG formation by writing directly through WTC 20. FIG. 2 contains UV absorbance measurements for both the inventive VG-containing silicone polymer WTC (identified in FIG. 2 as "high-T WTC") and a prior art urethane acrylate-based WTC (identified as "regular WTC"). The absorbance measurements were made for both liquid and cured samples, and were based upon a structure that held the WTC material between a pair of quartz plates.

The results are shown in FIG. 2 as plots of "absorbance units" (Au) as a function of wavelength. Curves 1 and 2 plot the absorbance as a function of wavelength for the liquid form of each WTC, curve 1 associated with the prior art WTC and curve 2 associated with the inventive WTC. Samples of each coating were then cured with a low-dosage UV exposure (1 J/cm$^2$) and their absorbance as a function of wavelength plotted by curves 3 (prior art) and 4 (high-T), respectively. High-power cured forms of both WTCs (e.g., 14 J/cm$^2$) yielded the results shown in curves 5 and 6.

As shown in FIG. 2, the absorbency of both the prior art urethane acrylate-based WTC and the inventive VG-containing silicone polymer WTC is least when the UV dose is highest. At the dose of 14 J/cm$^2$, the high-temperature VG-containing silicone polymer WTC used in the present invention shows a comparable low-level UV absorbance as the prior art conventional coating over the measured wavelengths, especially in the region of the 248 nm wavelength typically used for grating inscription. Thus, it is contemplated that the inventive VG-containing silicone polymer WTC performs just as well as the prior art in terms of providing a coating that is transparent to the wavelengths used for grating inscription.

As mentioned above, there is an increasing need to utilize a write-through coating that remains stable at elevated temperatures, and prior art WTCs have not been able to fully satisfy this requirement. Many sensor applications are associated with environmental conditions too harsh for human inspection, with the sensors exposed to elevated temperatures. Oil field applications, particularly down-hole monitoring of underground conditions within the well are just one set of examples. It has been found that the VG-containing silicone polymer WTC of the present invention meets this high temperature need, remaining stable at elevated operating temperatures for an extended period of time (e.g., several months, a year, etc.).

Figure 3:
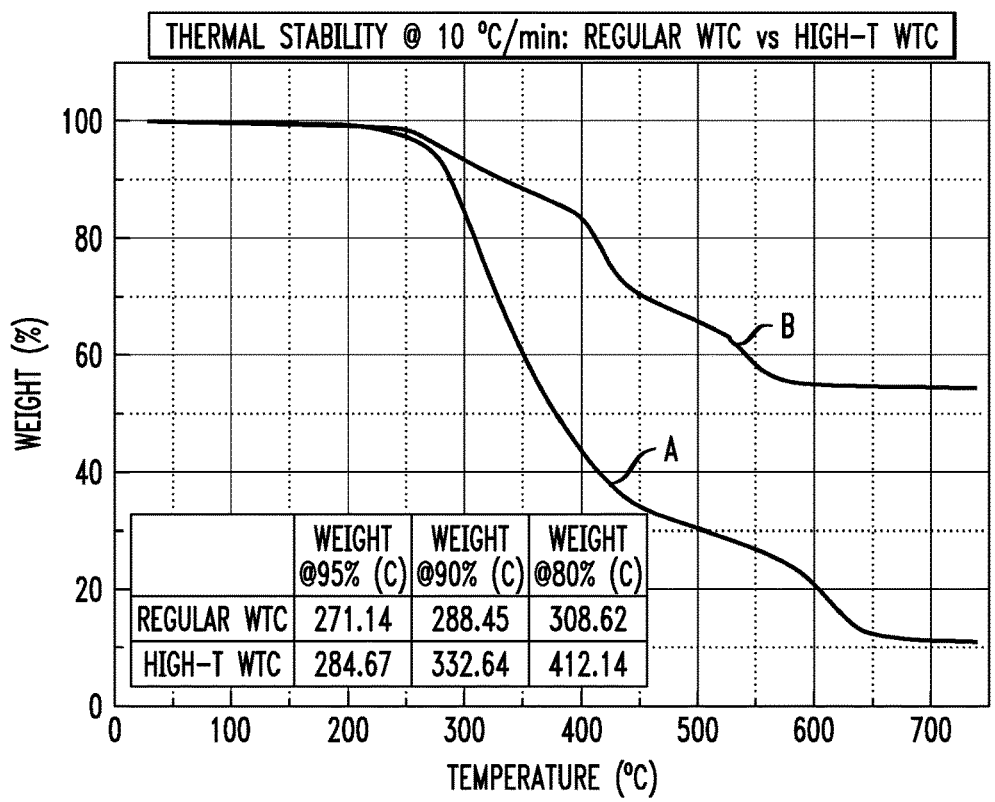
FIG. 3 contains plots of thermal stability for both a prior art WTC and a high-temperature WTC of the present invention.

The high temperature attributes of the VG-containing silicone polymer WTC of the present invention are confirmed by the data shown in the graphs of FIG. 3, which compare the thermal stability of the prior art WTC material (plot A) to the thermal stability of the inventive VG-containing silicone polymer WTC (plot B). This data was obtained by performing a thermogravimetric analysis (TGA) of each material, in which the mass of a sample is measured over time as its ambient temperature is changed in a regulated manner.

In this case, TGA was performed at a heating rate of 10° C./min under air atmosphere to determine the thermal degradation behavior of each coating material (prior art WTC and the inventive high-T WTC), collected from films cured at 14 J/cm$^2$. As shown, even though the VG-containing silicone polymer WTC exhibits a slight early stage degradation at low temperatures (similar to the prior art urethane acrylate-based WTC), the inventive VG-containing silicone polymer WTC is more stable at higher temperatures, and retains a higher percentage of its original mass over a much larger high temperature range.

Figure 4:
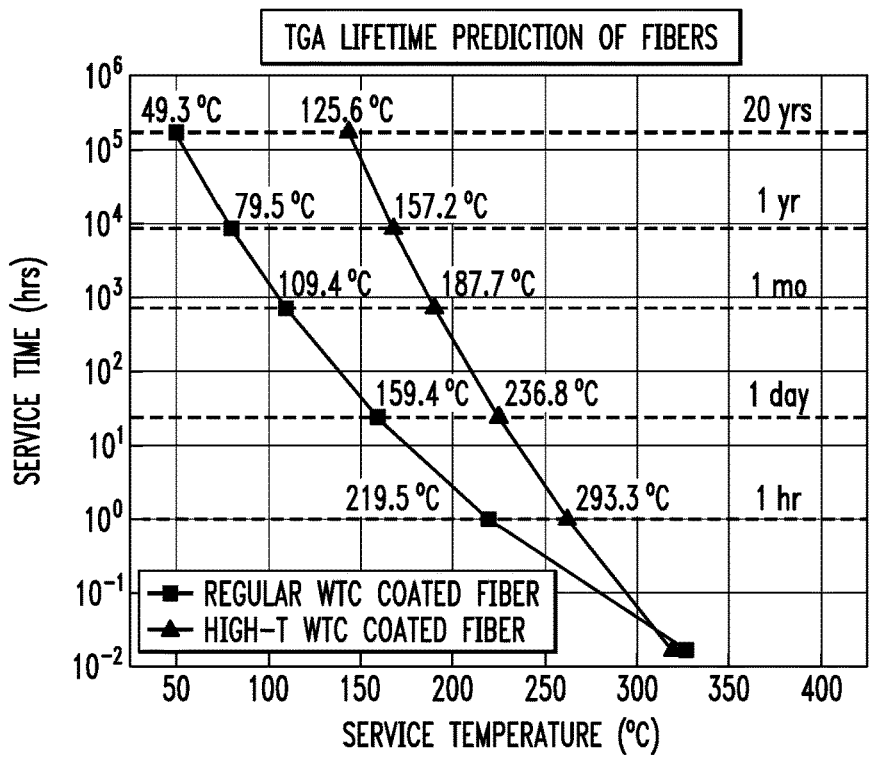
FIG. 4 illustrates a set of dynamic thermogravimetric analysis (TGA) lifetime predictions for both prior art WTCs and high-temperature WTCs of the present invention.

The possible lifetime of these WTCs at different service temperatures may be predicted by utilizing a dynamic TGA under different heating rates. One such set of heating rates that may be used for this study include the following: 0.5, 1, 2, 5, and 10° C./min. The TGA lifetime predictions based on these heating rates is shown in FIG. 4, which plots the same results for a prior art WTC coating. While a fiber coated with the prior art WTC is shown as being unable to survive more than one year at 80° C., a fiber having the VG-containing silicone polymer WTC of the present invention shows significant improvement in the lifetime over 150° C., a desirable attribute for high temperature sensor applications.

Figure 5:
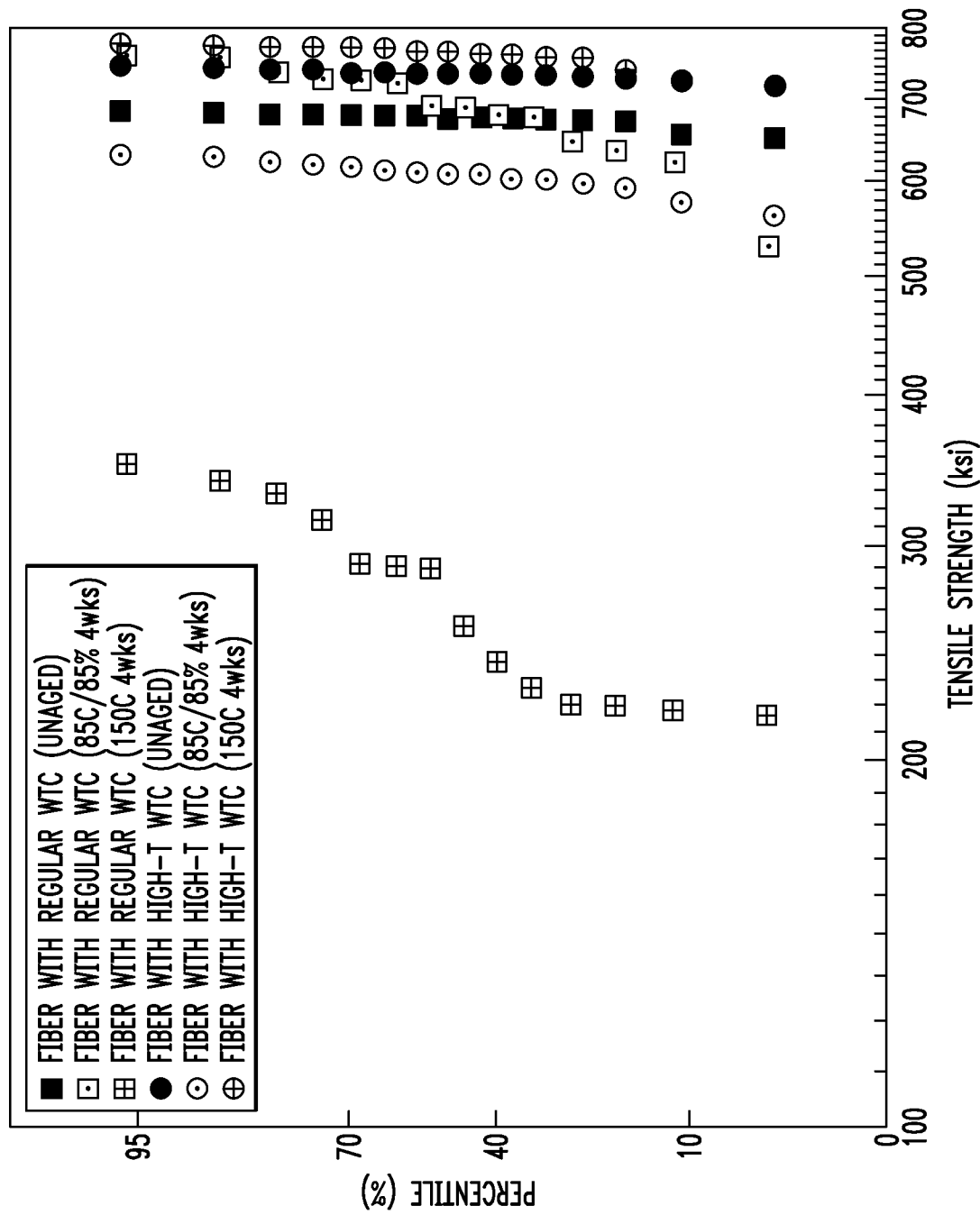
FIG. 5 contains Weibull plots comparing the tensile strength of a prior art WTC to the high-temperature WTC of the present invention.

It is essential to evaluate the fiber's robustness when subjected to environmental aging tests. FIG. 5 compares the fiber tensile strength of a fiber with a prior art urethane acrylate-based WTC and a fiber with the inventive VG-containing silicone polymer WTC. The plots illustrate tensile strength before and after aging. According to the Weibull plot, the fibers formed in accordance with the present invention exhibit a higher mechanical strength than the conventional fiber (700 ksi vs. 650 ksi). With respect to a first aging condition of 85° C., with 85% relative humidity for a four week time period, the prior art WTC fibers do not show noticeable weakening effect, with the fibers of the present invention showing only a slight drop in mechanical strength. Looking at the aging condition at 150° C. (dry), again for four weeks, prior art fibers show considerable deterioration in tensile strength, while the fibers with the VG-containing silicone polymer WTC of the present invention remain at the same high level of mechanical strength, demonstrating the superior feasibility of the VG-containing silicone polymer WTC for high temperature applications.

Figure 6:
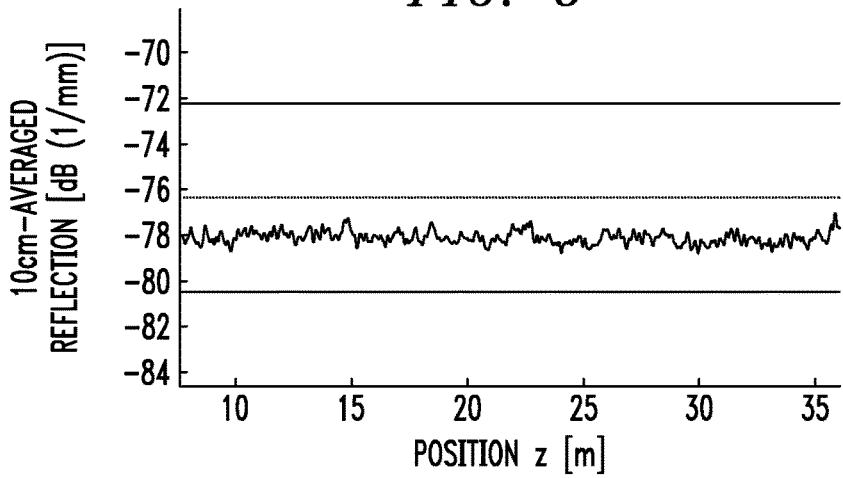
FIG. 6 is a plot showing an exemplary grating structure formed through a conventional WTC.
Figure 7:
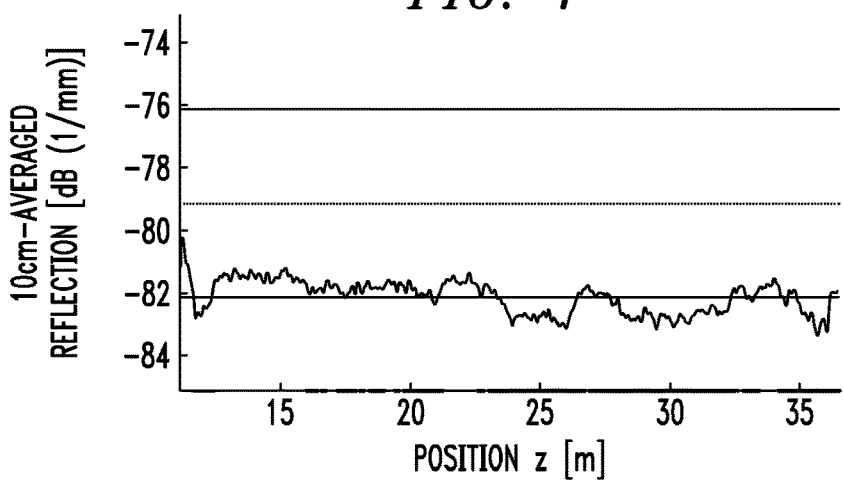
FIG. 7 is a plot showing the formation of a grating structure written under the same conditions as for FIG. 6, in this case formed through an exemplary embodiment of the inventive high-temperature WTC (here, a film cured at a relatively low power dosage)
Figure 8:
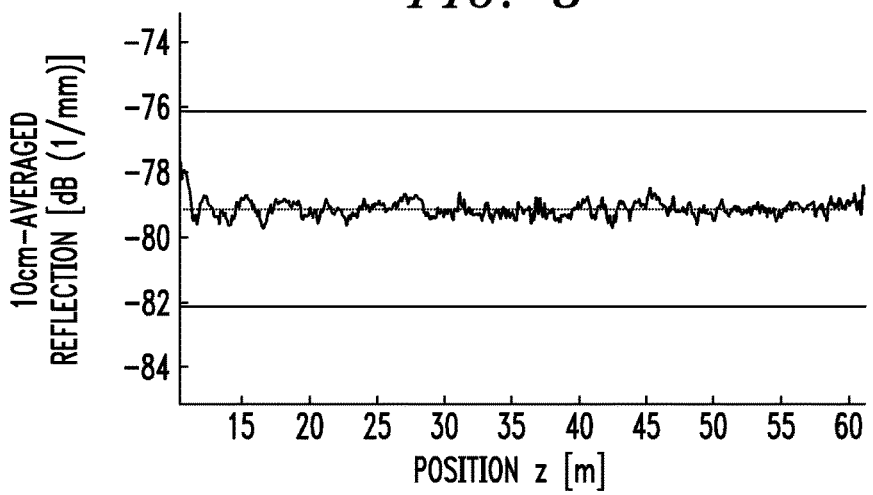
FIG. 8 is a plot showing the formation of a grating structure written under the same conditions as for FIGS. 6 and 7, in this case formed through a different embodiment of the inventive high-temperature WTC (here, a film cured at a relatively high power dosage)

FIGS. 6-8 illustrate the difference in grating quality between a fiber with a conventional (prior art) urethane acrylate-based polymer WTC (FIG. 6) and two different embodiments of the present invention—a VG-containing silicone polymer WTC of the present invention cured with a relatively low dosage UV exposure (FIG. 7), and a VG-containing silicone polymer WTC cured with a relatively high dosage UV exposure (FIG. 8). The grating structures for each fiber were fabricated on 25-50 m of fiber.

Referring to FIG. 6, the grating written into the fiber with the prior art WTC shows an average grating strength of around −78 dB. Using the same setup and process for grating inscription, a fiber having the low-dose cured VG-containing silicone polymer WTC of the present invention exhibited somewhat decreased amplitude, with an average value of about −82 dB. However, in comparing the results of FIGS. 7 and 8, it is evident that a stronger amplitude and better uniformity of the grating is achieved with less variation when the VG-containing silicone polymer WTC is cured with a higher dosage UV exposure. In particular, the results depicted in FIG. 8 show an average grating strength of about −79 dB, close to the standard results of the prior art coating. This result is in good agreement with the absorbency measurements shown in FIG. 2, where the higher UV dose facilitates a more UV transparent coating.

Figure 9:
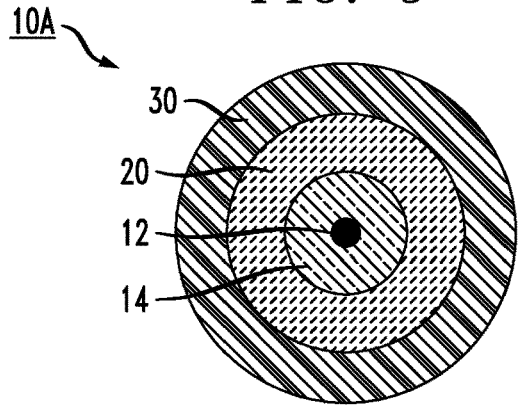
FIG. 9 is a cross-sectional view of an alternative embodiment of the present invention, where in this case an outer layer exhibiting additional thermal stability is formed to surround the high-temperature WTC layer.

As discussed above, one advantage of the VG-containing silicone polymer WTC of the present invention is its ability to remain stable at high temperatures. Additional improvements in the thermal robustness of the fiber of the present invention may be made by surrounding VG-containing silicone polymer WTC 20 with an up-buffer polymer coating of a material such as, but not limited to, poly(ethene-co-tetrafluoroethene (ETFE)), fluorinated ethylene propylene (FEP), polyvinylidene fluoride (PVDF), polyether ether ketone (PEEK), and polyfluoroalkoxy (PFA). In many commercial fabrication processes, PEEK is selected for its ease of use and suitable performance results. FIG. 9 illustrates an exemplary fiber 10A formed in accordance with this embodiment of the present invention, where VG-containing silicone polymer WTC 20 is surrounded by an up-buffer PEEK layer 30.

Figure 10:
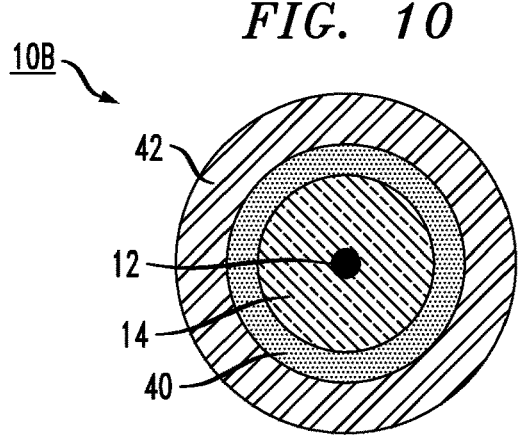
FIG. 10 is a cross-sectional view of yet another embodiment of the present invention, in this case using a dual-layer WTC configuration, with an inner layer being relatively soft and pliable and an outer layer being stiffer to impart additional mechanical stability.

FIG. 10 illustrates yet another embodiment of the present invention, in this case utilizing a dual-layer WTC coating. Here, an optical fiber 10B includes a primary coating 40 of the VG-containing silicone polymer WTC, primary coating 40 formed as a soft WTC to enable grating inscription, while also protecting the optical fiber from microbending and thermal degradation. The thickness of primary coating 40 is typically in the range of 10-20 μm. A secondary coating 42 of the VG-containing silicone polymer WTC is then formed over primary coating 40, where secondary coating 42 is formed as a rigid layer of essentially the same thickness that further protects optical fiber 10B from mechanical handling, while still providing the transparency required for grating transcription.

Figure 11:
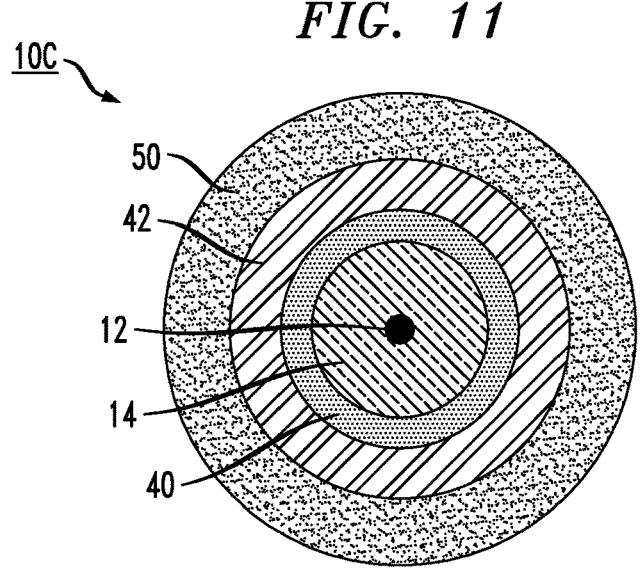
FIG. 11 is a cross-sectional view of an embodiment where the thermal stability layer shown in FIG. 9 is disposed over the dual-layer WTC configuration of FIG. 10.

In yet another configuration, shown as optical fiber 10C in FIG. 11, a temperature stabilizing outer jacket 50 (of a material such as PEEK) is disposed to surround a dual-layer configuration of the inventive VG-containing silicone polymer WTC (an extrusion process typically used to over-jacket the structure with the PEEK material). In FIG. 11, the dual-layer configuration contains the same reference numerals as used in FIG. 10, defining the dual-layer structure as comprising a primary (relatively pliable) coating layer 40 and a secondary (relatively stiff) coating layer 42.

While this disclosure describes exemplary embodiments, it will be understood by those skilled in the art that various changes can be made and equivalents can be substituted for elements thereof without departing from the scope of the disclosed embodiments. In addition, many modifications can be made to adapt a particular situation or material to the teachings of this disclosure without departing from the essential scope thereof. Therefore, it is intended that this disclosure not be limited to the particular embodiments disclosed and the scope of the present invention is instead intended to be limited only by the claims appended hereto.

What is claimed is:

1. An optical fiber comprising
an optical core region;
a cladding layer surrounding the optical core region; and
a vinyl group-containing silicone polymer, non-adhesive, non-tacky coating disposed on and in intimate contact with the cladding layer, the vinyl group-containing silicone polymer coating having a UV absorbance of less than about 0.5 Au at wavelengths used for grating inscription and a thermal stability at temperatures up to about 150° C.

2. The optical fiber as defined in claim 1 wherein the vinyl group-containing silicone polymer, non-adhesive, non-tacky coating comprises a radical polymerization-type vinyl-silicone polymer.

3. The optical fiber as defined in claim 1 wherein the vinyl group-containing silicone polymer, non-adhesive, non-tacky coating is cured at an energy of at least 1 $J/cm^2$.

4. The optical fiber as defined in claim 3 wherein the vinyl group-containing silicone polymer, non-adhesive, non-tacky coating is cured at an energy of about 14 $J/cm^2$.

5. The optical fiber as defined in claim 1 wherein the optical core and cladding layer comprise a glass material.

6. The optical fiber as defined in claim 1 wherein the optical fiber further comprises
a high-temperature thermoplastic cabling polymer jacket extruded over the vinyl group-containing silicone polymer, non-adhesive, non-tacky coating.

7. The optical fiber as defined in claim 6 wherein the high-temperature thermoplastic cabling polymer jacket comprises a material selected from the group consisting of: polyether-ether-ketone (PEEK), ethylene tetrafluoroethylene (ETFE), fluorinated ethylene proplylene (FEP), polyvinylidene fluoride (PVDF), and perfluoroalkoxy (PFA).

8. The optical fiber as defined in claim 1 wherein the vinyl group-containing silicone polymer, non-adhesive, non-tacky coating comprises a dual-layer coating including:
an inner primary layer of vinyl group-containing silicone polymer exhibiting a pliable form; and
an outer secondary layer of vinyl group-containing silicone polymer exhibiting a rigid form, the outer secondary layer included to improve mechanical handling of the optical fiber.

9. The optical fiber as defined in claim 8 wherein the inner primary layer and the outer secondary layer each comprise a thickness on the order of 10-20 µm.

10. The optical fiber as defined in claim 8 wherein the optical fiber further comprises
a high-temperature thermoplastic cabling polymer jacket extruded over the outer secondary layer of the vinyl group-containing silicone polymer coating.

11. The optical fiber as defined in claim 10 wherein the high-temperature thermoplastic cabling polymer jacket comprises a material selected from the group consisting of: polyether-ether-ketone (PEEK), ethylene tetrafluoroethylene (ETFE), fluorinated ethylene proplylene (FEP), polyvinylidene fluoride (PVDF), and perfluoroalkoxy (PFA).

12. A method of fabricating an optical fiber comprising the steps of:
a) providing an initial fiber having a core region and a cladding layer surrounding the core region;
b) applying a vinyl group-containing silicone polymer liquid material over the cladding layer; and
c) curing the vinyl group-containing silicone polymer liquid material into a non-adhesive, non-tacky write-through coating having a UV absorbance of less than 0.5 Au at wavelengths used for grating inscription and a thermal stability at temperatures up to about 150° C.

13. The method as defined in claim 12 wherein the method further comprises the step of
writing one or more fiber Bragg gratings into the initial fiber through the non-adhesive, non-tacky write-through coating by exposing the fiber to a pattern of ultraviolet radiation.

14. The method as defined in claim 12 wherein the method further comprises the steps of:
applying a second portion of vinyl group-containing silicone polymer liquid material over the write-through coating formed in step c); and
curing the second portion of vinyl group-containing silicone polymer liquid material to form an outer non-adhesive, non-tacky write-through coating having a UV absorbance of less than 0.5 Au at wavelengths used for grating inscription and a thermal stability at temperatures up to about 150° C.

15. The method as defined in claim 12 wherein the curing step is performed at an energy of at least 1 $J/cm^2$.

16. The method as defined in claim 15 wherein the curing step is performed at an energy of about 14 $J/cm^2$.

* * * * *